(12) United States Patent
Vandewall et al.

(10) Patent No.: US 9,708,064 B2
(45) Date of Patent: Jul. 18, 2017

(54) AIRCRAFT GALLEY SINK STATIONS HAVING MOVABLE SINK COVERS

(71) Applicant: The Boeing Company, Chicago, IL (US)

(72) Inventors: Cynthia A. Vandewall, Snohomish, WA (US); Mun Yee Chew, Singapore (SG); Fang Rong Bonnibelle Hoo, Singapore (SG)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 14/637,035

(22) Filed: Mar. 3, 2015

(65) Prior Publication Data
US 2016/0257405 A1    Sep. 8, 2016

(51) Int. Cl.
| | | |
|---|---|---|
| *B64D 11/04* | (2006.01) | |
| *B64D 11/02* | (2006.01) | |
| *E03C 1/186* | (2006.01) | |
| *A47K 1/04* | (2006.01) | |
| *A47K 1/12* | (2006.01) | |
| *A47K 1/00* | (2006.01) | |

(52) U.S. Cl.
CPC ............... *B64D 11/02* (2013.01); *A47K 1/00* (2013.01); *A47K 1/04* (2013.01); *A47K 1/12* (2013.01); *B64D 11/04* (2013.01); *E03C 1/186* (2013.01)

(58) Field of Classification Search
CPC .................................. B64D 11/02; B64D 11/04
See application file for complete search history.

(56) References Cited

U.S. PATENT DOCUMENTS

| 57,284  | A | * | 8/1866 | Bryent  | .............. | A47L 19/02 |
| | | | | | | 137/247.39 |
| 160,540 | A | * | 3/1875 | Murdock | .............. | A47L 19/02 |
| | | | | | | 4/656 |

(Continued)

FOREIGN PATENT DOCUMENTS

| WO | 2012135371 A1 | 10/2012 |
| WO | 2013136282 A2 | 9/2013 |
| WO | 2013142790 A2 | 9/2013 |

OTHER PUBLICATIONS

"Perforated Cover, for Sink Bowl", Global Equipment Company Inc., Retrieved from the Internet: <http://www.globalindustrial.com/p/plumbing/sinks/bar-sinks/perforated-cover-for-sink-bowls>, Accessed on Jan. 12, 2015, 2015, 3 pgs.

*Primary Examiner* — Tien Dinh
*Assistant Examiner* — Michael A Fabula
(74) *Attorney, Agent, or Firm* — Kwan & Olynick LLP

(57) ABSTRACT

Sink stations for galleys of aircraft and other vehicles, methods of operating such sink stations, and aircraft equipped with galleys having such sink stations. A sink station includes a sink cover, which may fully or partially cover a sink and extend the countertop space over the sink cavity. When covering the sink, the sink cover may support a set weight corresponding to objects typically used in galleys, such as pots, cups, and the like. The sink cover allows for liquid to pass into the sink cavity even when the sink cover is used to cover the sink thereby reduce spill clean-ups. The sink cover is movable and may partially or completely expose the sink cavity or keep it completely covered. For example, the sink cover may be folded and/or rolled away and stored at the sink station for periodic use.

18 Claims, 13 Drawing Sheets

(56) References Cited

U.S. PATENT DOCUMENTS

| | | | | |
|---|---|---|---|---|
| 914,120 A * | 3/1909 | Demarest | ............... | E03C 1/186 4/638 |
| 916,283 A * | 3/1909 | Eccleston | ............... | A47L 19/02 4/656 |
| 1,641,061 A * | 8/1927 | Young | ............... | A47L 19/02 4/656 |
| 2,308,123 A * | 1/1943 | Stein | ............... | E03C 1/186 4/638 |
| 2,334,293 A * | 11/1943 | Stein | ............... | E03C 1/186 4/642 |
| 2,367,321 A * | 1/1945 | Wheeler | ............... | A47L 19/02 4/637 |
| 2,591,467 A * | 4/1952 | Rodefer | ............... | D06F 45/26 211/88.01 |
| 3,346,886 A * | 10/1967 | Kashiwamura | ............... | E03C 1/186 108/134 |
| 4,082,391 A * | 4/1978 | Turner | ............... | B60P 3/36 126/332 |
| 4,305,166 A * | 12/1981 | Rose | ............... | E03C 1/186 4/631 |
| 4,351,073 A * | 9/1982 | Elsas | ............... | A47K 1/06 4/654 |
| 4,456,021 A * | 6/1984 | Leavens | ............... | E03C 1/182 134/115 R |
| RE32,176 E * | 6/1986 | Vernon | ............... | A47B 77/02 186/40 |
| 5,073,997 A * | 12/1991 | Rabe | ............... | E03C 1/18 312/22 |
| 5,083,727 A * | 1/1992 | Pompei | ............... | B64D 11/0007 105/345 |
| D324,902 S * | 3/1992 | Kohler, Jr. | ............... | D23/271 |
| 5,257,423 A * | 11/1993 | Jacobsen | ............... | E03B 9/20 312/228 |
| 5,406,656 A * | 4/1995 | Somerton | ............... | A47J 47/20 4/631 |
| 5,815,855 A * | 10/1998 | McKeehan | ............... | E03C 1/186 165/185 |
| 6,223,361 B1 * | 5/2001 | Rozenblatt | ............... | B64D 11/04 4/321 |
| D449,875 S * | 10/2001 | Fludd-Robinson | ... | A47J 47/005 D23/287 |
| 7,011,542 B2 * | 3/2006 | Suzuki | ............... | H01R 13/641 439/374 |
| 7,305,723 B2 * | 12/2007 | Fulks | ............... | A47J 47/005 4/631 |
| 7,568,239 B2 * | 8/2009 | Spruner von Mertz | ............... | A47J 47/005 4/654 |
| 8,544,795 B2 | 10/2013 | Guering et al. | | |
| 9,032,567 B1 * | 5/2015 | Galgano | ............... | E03C 1/186 4/657 |
| 9,085,884 B2 * | 7/2015 | Lopchinsky | ............... | E03C 1/186 |
| 2004/0216222 A1 * | 11/2004 | Rood | ............... | B64D 11/04 4/286 |
| 2005/0070152 A1 * | 3/2005 | Suzuki | ............... | H01R 13/641 439/501 |
| 2005/0074231 A1 * | 4/2005 | Suzuki | ............... | B64D 11/04 392/444 |
| 2007/0157378 A1 | 7/2007 | Kendall et al. | | |
| 2007/0228216 A1 * | 10/2007 | Wenstrom | ............... | B64D 11/04 244/118.5 |
| 2009/0100591 A1 * | 4/2009 | Lee | ............... | A47K 10/08 4/548 |
| 2010/0140398 A1 * | 6/2010 | Cunningham | ............... | A47J 31/005 244/118.5 |
| 2011/0254304 A1 * | 10/2011 | Moresco | ............... | B60P 3/36 296/24.4 |
| 2012/0285335 A1 * | 11/2012 | Cunningham | ............... | B64D 11/04 99/323.1 |
| 2013/0206904 A1 * | 8/2013 | Gee | ............... | B64D 11/02 244/118.5 |
| 2013/0248649 A1 * | 9/2013 | Burd | ............... | B64D 11/04 244/1 N |
| 2015/0028157 A1 * | 1/2015 | Hoogeveen | ............... | B64D 11/0007 244/118.1 |
| 2016/0032573 A1 * | 2/2016 | Gavin | ............... | E03C 1/186 4/654 |

* cited by examiner

AIRCRAFT GALLEY SINK STATIONS HAVING MOVABLE SINK COVERS

TECHNICAL FIELD

This disclosure generally relates to aircraft galley sink stations. More specifically, this disclosure relates to aircraft galley sink stations having removable sink covers that allow extending the counter space or, more generally, work space within aircraft galleys.

BACKGROUND

Passenger aircraft and other types of vehicles, such as ships, trains, recreational vehicles (RVs), typically include service galleys for preparing meals and refreshments for passengers and crew. These service galleys or, simply, galleys are also used to store food, emergency equipment storage, and other items. For example, an aircraft galley may include multiple service carts provided by airlines used by cabin crew for transporting, storing, and serving beverages, food, and other items. The space in these galleys is extremely limited and, as a result, many options are not provided. Specifically, most aircraft galleys do not include sink stations in order to maintain adequate countertop space. Galleys without sinks have a reduced functionality. For example, various items cannot be washed, and liquids cannot be easily disposed of. A crew may be forced to use aircraft lavatories, which may cause contamination of various items and reduce availability of the lavatories for passengers. Furthermore, vibration and other motions associated with vehicle operations make it very difficult for the crew to handle liquids on the countertop. As a result, liquids are often spilled and require extensive clean ups.

SUMMARY

Provided are sink stations for galleys of aircraft and other vehicles as well as methods of operating such sink stations. Also provided are aircraft equipped with galleys having such sink stations. A sink station includes a sink cover, which can fully or partially cover a sink and extend the countertop space over the sink cavity. When covering the sink, the sink cover may support a set weight corresponding to objects typically used in galleys, such as pots, cups, and the like. The sink cover allows for liquid to pass into the sink cavity even when the sink cover is used to cover the sink. The sink cover is movable and may partially or completely expose the sink cavity or keep it completely covered. For example, the sink cover may be folded and/or rolled away and stored at the sink station for periodic use.

In some embodiments, an aircraft galley sink station includes a sink, faucet, and sink cover. The sink includes a back wall, front wall, left side wall, right side wall, and bottom. It should be noted that the sink does not necessarily have a rectangular shape and/or four distinct walls, such as four walls are clearly separated by edges. For example, the sink may have a round cavity or an oval cavity such that the back wall, front wall, left side wall, and right side wall are portions of a perimeter. In some embodiments, the sink is rectangular or substantially rectangular (e.g., straight portions of the walls collectively represent at least about 75% of the sink perimeter). The back wall, front wall, left side wall, right side wall, and bottom form a sink cavity.

The faucet is used for delivering water into the sink cavity. The faucet may include a valve or some other device for controlling the flow of water into the sink cavity. Furthermore, the faucet may be used for delivering and combining two or more water flows, e.g., hot water and cold water.

The sink cover may be movably connected to at least one wall. For example, the sink cover may be movably connected to back wall as shown in FIGS. 2A and 2B. In some embodiments, the sink cover is connected or supported by all four walls, when the sink cover is in the covered position. The sink cover is movable with respect to the sink between the covered position and open position. The covered position may be also referred to as a closed position. In some embodiments, the sink cover may be also moved into a partially covered position. In the partially covered position, a portion of the sink cavity may be exposed and accessible, while in the open position of the sink cover substantially all of the sink cavity may be exposed and accessible.

In some embodiments, when the sink cover is in the covered position, the sink cover substantially covers the entire sink cavity. In this position, the sink cover is disposed between the faucet and the bottom of the sink cavity. Furthermore, in the covered position, the sink cover may extend substantially parallel to the plane defined by the top edges of the back wall, front wall, left side wall, and right side wall. In some embodiments, the sink cover may extend within this plane, e.g., may be coplanar. Alternatively, the sink cover may be recessed into the sink cavity and be positioned below this plane. In the covered position, the sink cover may be configured to support a set weight exerted on to the sink cover in the direction substantially perpendicular to the plane defined by the top edges of the four walls. This direction may be referred to as a vertical direction.

In some embodiments, the sink cover is supported by at least two of the four walls when the sink cover is in the covered position. For example, the sink cover may be supported by the left side wall and right side wall. In some embodiments, the left side wall and right side wall are equipped with rails to provide this support in the covered position and any of the partially covered positions. In some embodiments, the sink cover may be supported by the back wall when the sink cover is in both covered and open positions. For example, the sink cover may be pivotably connected to at least the back wall. More specifically, the sink cover may include a hinge that allows the sink cover to move with respect to the sink or, more specifically, to swing with respect to the attachment point on the sink, which allows the sink cover to move between the covered and open position. In some embodiments, the sink cover is supported by all four walls while the sink cover is in the covered position.

In some embodiments, the sink cavity is substantially open when the sink cover is in the open position. In this position, the sink cover may be substantially removed from the sink cavity opening formed by the top edges of the four walls, which allows a full access to the sink cavity. For example, the sink cover may be folded into the opening provided in one of the walls. Alternatively, the sink cover may be suspended inside the sink or outside of the sink. Furthermore, the sink cover may be rolled between the covered and open positions.

In some embodiments, the sink cover includes a plurality of openings allowing a liquid to pass through the sink cover and into the sink when the sink cover is in the covered position. The size of these openings maybe such that the openings prevent objects typically used on the counterspace of the galley to fall through the openings and into the sink.

In some embodiments, the sink cover includes a metal mesh, or alternatively a plastic, or fiber or equivalent material, mesh.

In some embodiments, when the sink cover is in the covered position, the sink cover extends within the plane defined by top edges of the four walls. In this case, the sink cover may become extension of the counter surrounding the sink and may extend within the same plane as the countertop. Specifically, the top edges of at least the left side wall or the right side wall may be parts of a countertop of an aircraft galley. This feature allows the objects to be slid between the countertop and sink cover. Alternatively, the sink cover may be recessed into the sink cavity when in the covered position to prevent water splashing.

In some embodiments, the sink cover is separably connected to the at least one of the four walls allowing the sink cover to be separated and removed from that wall. It should be noted that the sink cover may be separably connected two or more of the four walls and, in some embodiments, to all four walls. Alternatively, the sink cover may be separated from one or more walls and remain connected to at least one wall. For example, the sink cover may be separably connected to the left side wall and right side wall supporting the sink cover when the sink cover is in the closed position. When the sink cover moves into the open position, it may be separated from the left side wall and right side wall. However, the sink cover may remain connected to the back wall or the front wall.

In some embodiments, the back wall of the sink may include compartment. The sink cover may be positioned in the compartment when the sink cover is in the open position. In other words, the compartment may be used for storing the sink cover when the sink cover is not in use and does not cover the sink cavity. The sink may include a compartment cover covering the compartment and preventing liquids from getting into the compartment during operation of the sink station. Furthermore, the sink may include a drain connected to the compartment to evacuate liquid from the compartment, such as liquid dropping from the sink cover, and to ensure drying of the sink cover when the sink cover is stored in the compartment.

In some embodiments, the sink cover is foldable. For example, the sink cover may include one or more hinges disposed between the edges of the sink cover. These hinges allow the sink cover to fold. The folding feature allows storing the sink cover in a smaller spacer. Furthermore, this folding feature also allows partially covering the sink cavity with the folded sink cover while keeping a portion of the sink cavity accessible. For example, the sink cover may include a front portion and a back portion. The front portion may be movable relative to the sink independently from the back portion allowing a partially closed position of the sink cover. In some embodiments, the front portion and the back portion are connected by a middle hinge. The back portion may be supported by at least one of the left side wall or the right side wall when the sink cover is in the partially closed position.

In some embodiments, the sink cover includes a first portion and a second portion. The first portion and the second portion may be independently attached (e.g., pivotably attached) to the back wall of the sink. The first portion may include a first front portion and first back portion pivotably attached to the first front portion. The second portion may include a second front portion and second back portion pivotably attached to the second front portion.

In some embodiments, the aircraft galley sink station includes a first rail and second rail supporting the sink cover in the covered position. The first rail and second rail may also support the sink cover while it moves between the covered and open positions. The first rail may be disposed along or, more specifically, attached to the left side wall. The second rail may be disposed along or, more specifically, attached to the right side wall. In these embodiments, the sink cover may include multiple hinges extending between the first rail and the second rail. The multiple hinges separate multiple portions of the sink cover foldable with respect to each other thereby allowing the sink cover to advance along the first rail and the second rail between the covered and open positions. The hinges allow the sink cover to follow the profile along the first rail and second rail, which may be curved. In some embodiments, the hinges allow the sink cover to be rolled up for storage.

In some embodiments, the sink cover includes a rollable base and a take-up roll for receiving the rollable base when the sink cover is in the opened positioned. The rollable base may be formed by rigid portions connected by hinges, both of which may extend across the entire dimension of the sink. The rollable base may provide support to objects positioned onto the base when the sink cover is in the open position.

Also provided is an aircraft including a fuselage and an aircraft galley sink station positioned with the fuselage. Various examples of aircraft galley sink stations are described above. Also provided is a method for reconfiguring an aircraft sink station. In some embodiments, the method involves providing the aircraft sink station. The method may also involve at least partially opening the sink cover, which involves at least partially removing the sink cover from the sink. Furthermore, the method may involve at least partially closing the sink cover, which involves at least partially covering the sink with the sink cover. In some embodiments, the sink cover is fully closed or fully open during these operations. Alternatively, the sink cover may be partially closed after either one of these operations.

BRIEF DESCRIPTION OF THE DRAWINGS

Figure 1:
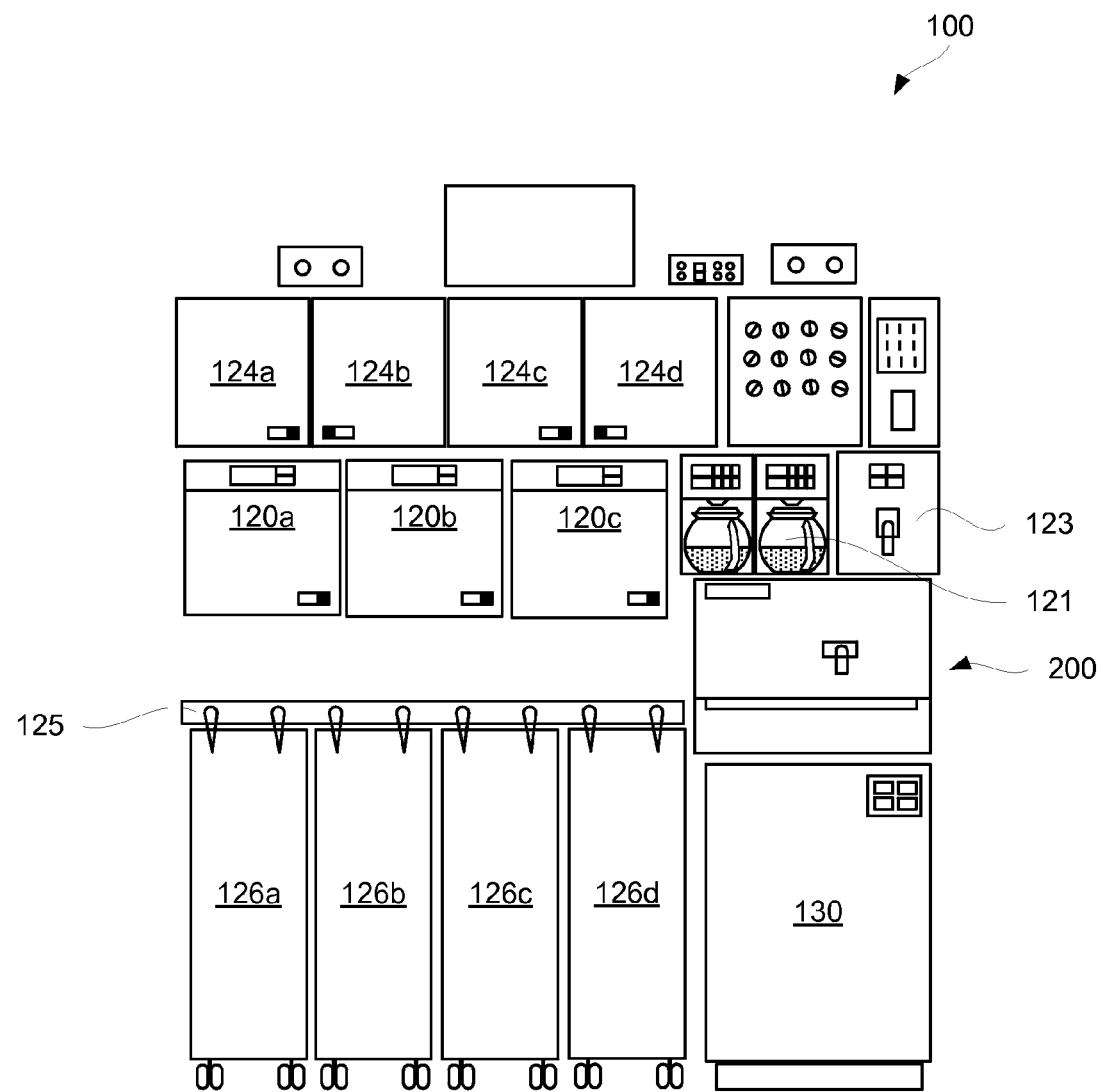

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic representation of a galley having a sink station, in accordance with some embodiments.

Figure 2A:
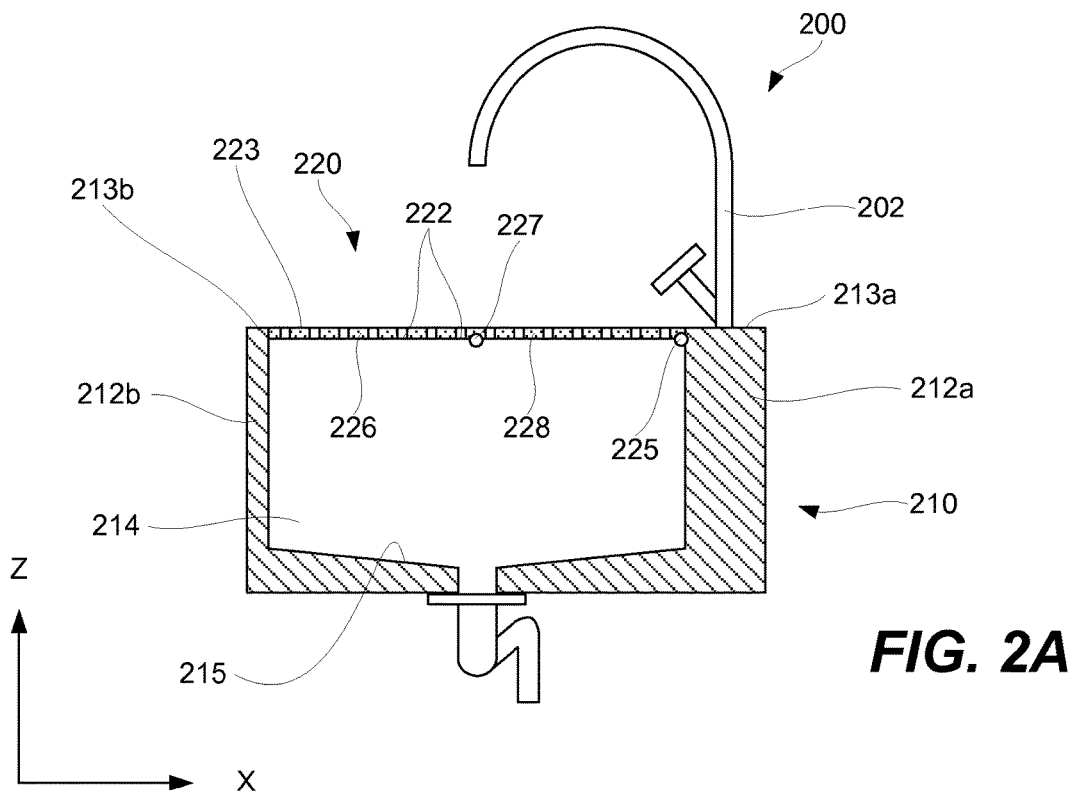

FIG. 2A is a schematic cross-sectional side view of a sink station with a sink cover in the covered position, in accordance with some embodiments.

Figure 2B:
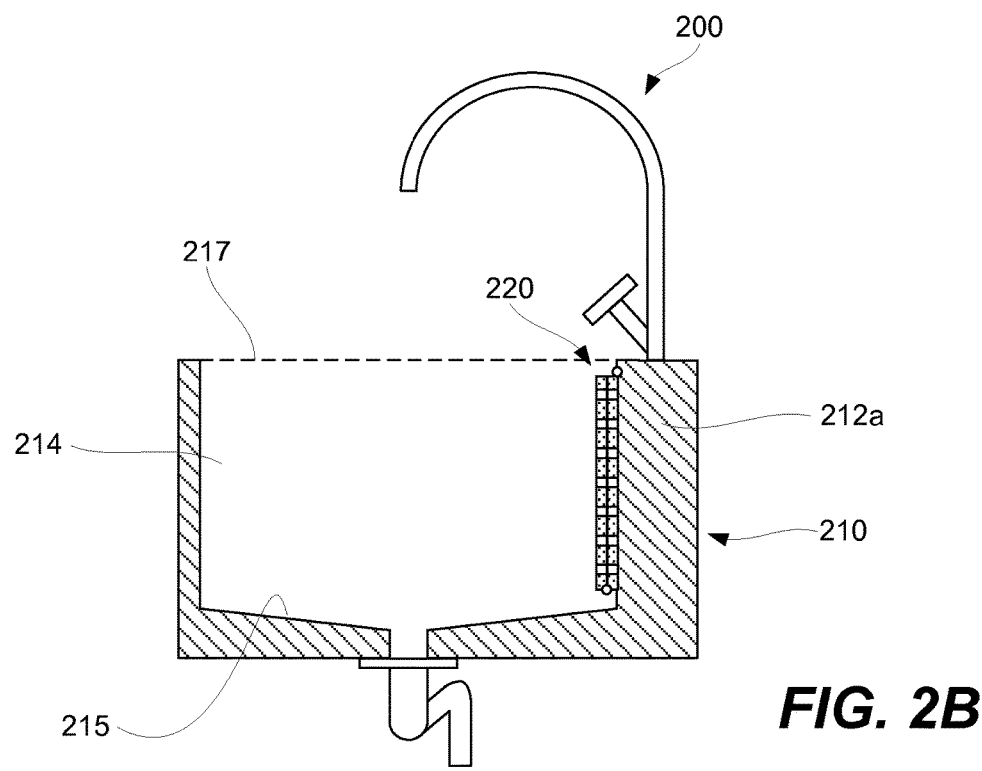

FIG. 2B is a schematic cross-sectional side view of the sink station of FIG. 2A with the sink cover in the open position, in accordance with some embodiments.

Figure 2C:
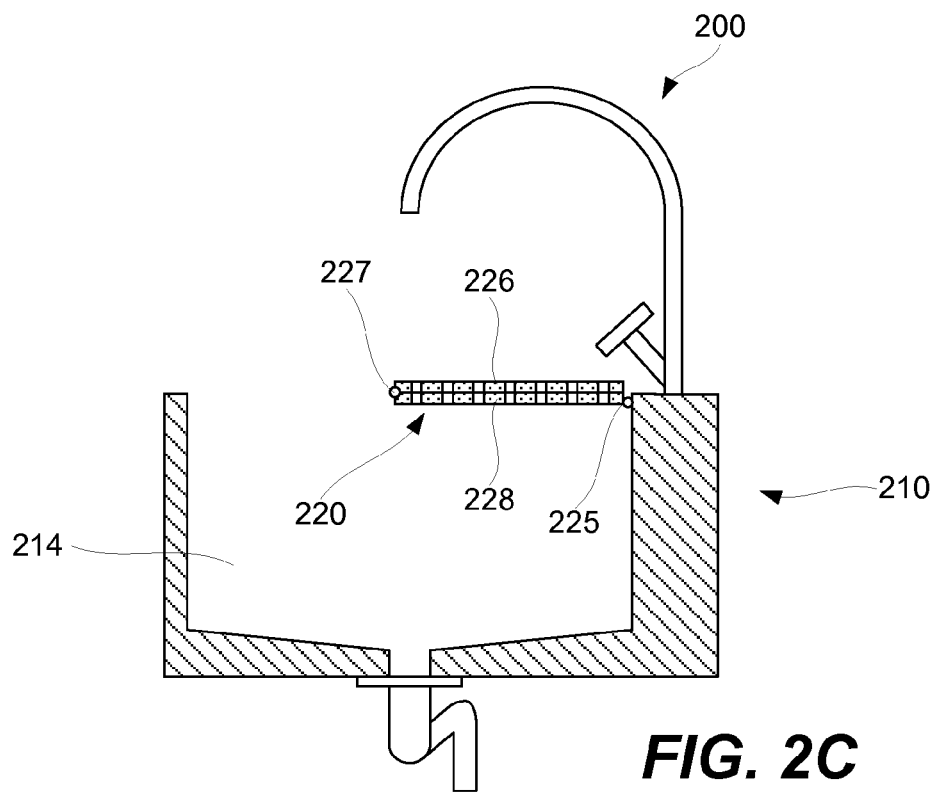
Figure 2D:
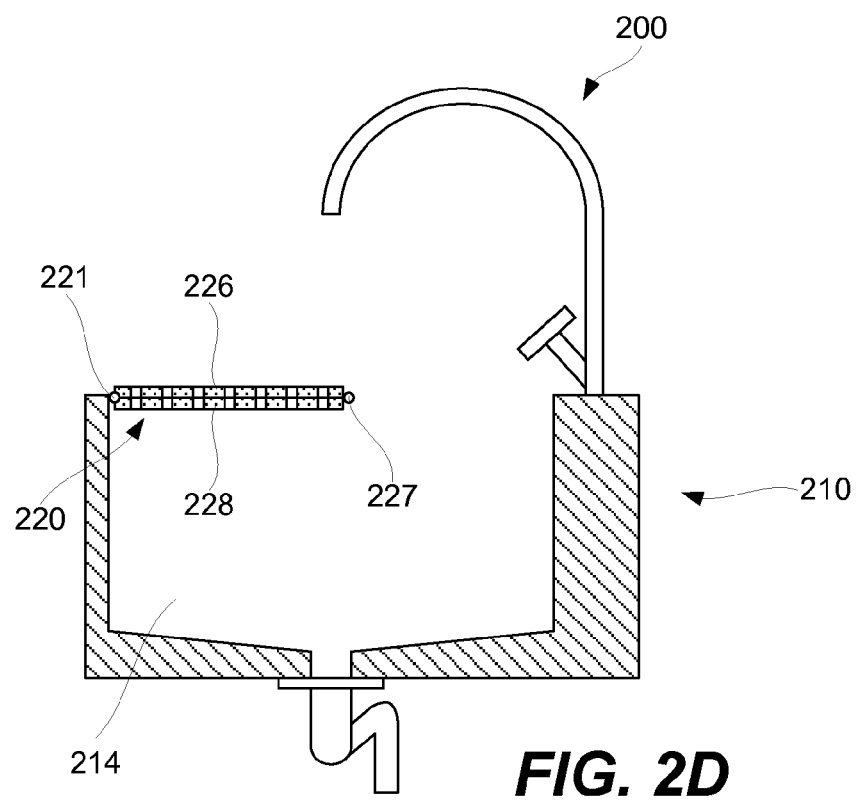

FIGS. 2C and 2D are schematic cross-sectional side views of the sink station of FIG. 2A with the sink cover in two different partially open positions, in accordance with some embodiments.

Figure 2E:
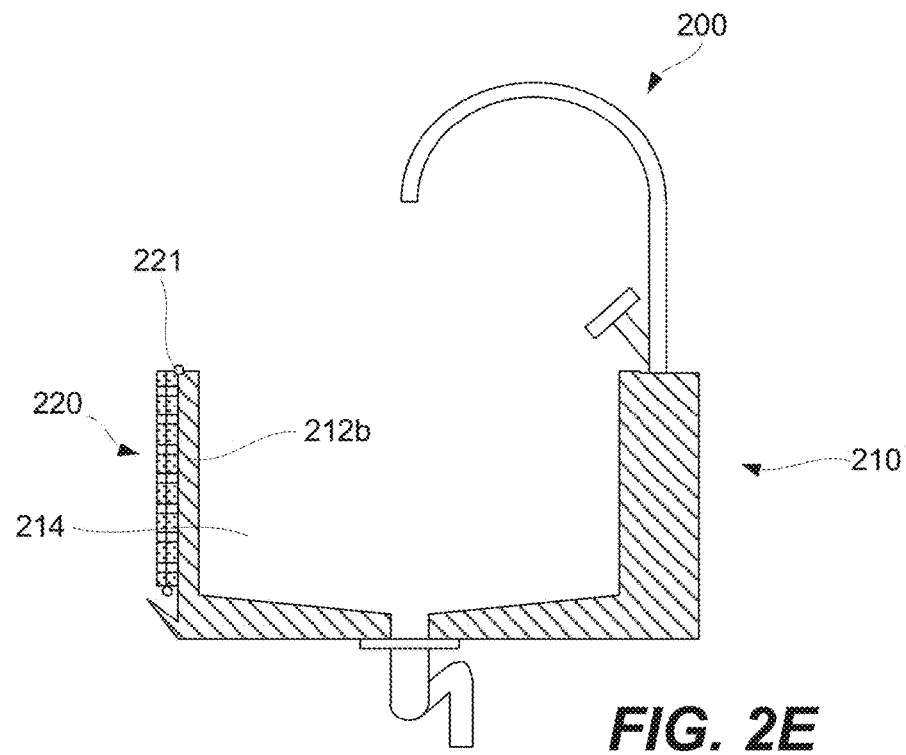
Figure 2F:
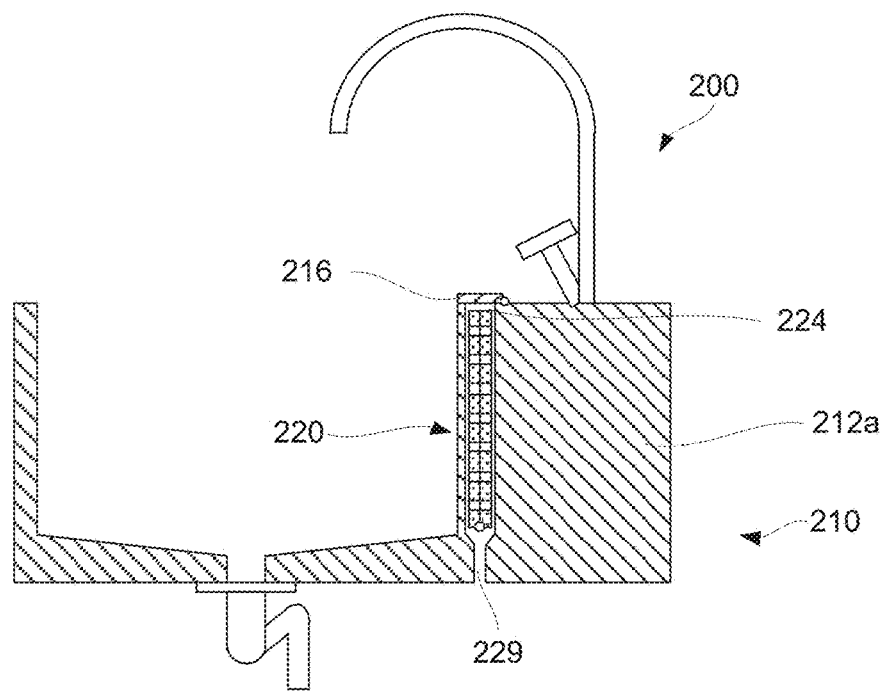

FIGS. 2E and 2F are schematic cross-sectional side views of the sink station of FIG. 2A with the sink cover in the open position showing different storage locations for the sink cover, in accordance with some embodiments.

Figure 2G:
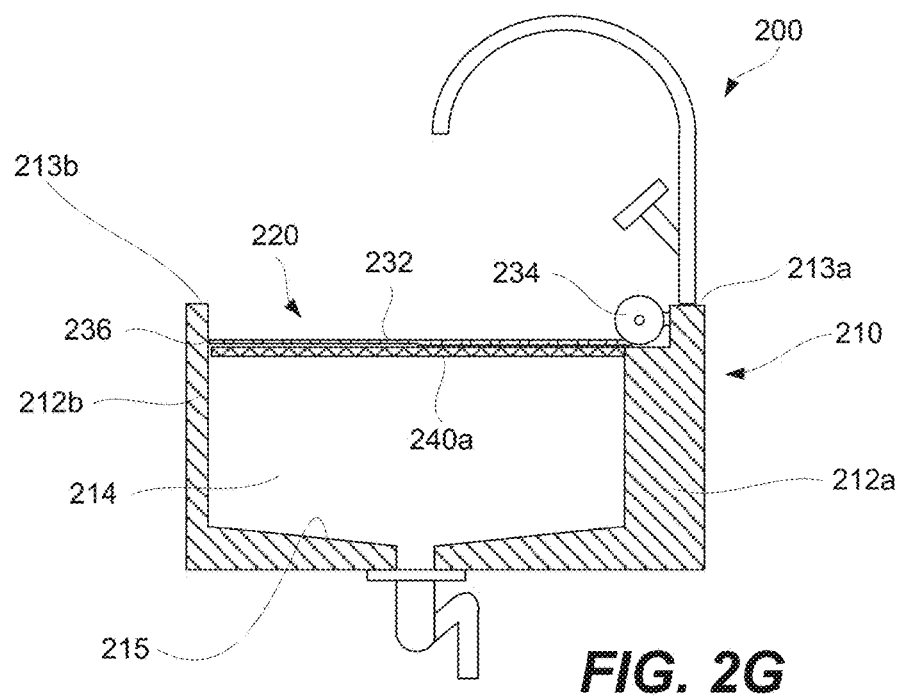

FIG. 2G is a schematic cross-sectional side view of a sink station having a rollable sink cover shown in the open position, in accordance with some embodiments.

Figure 2H:
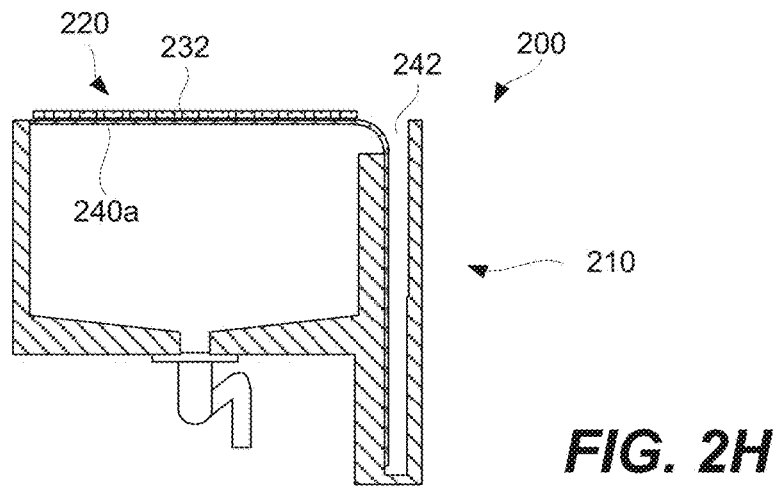
Figure 2I:
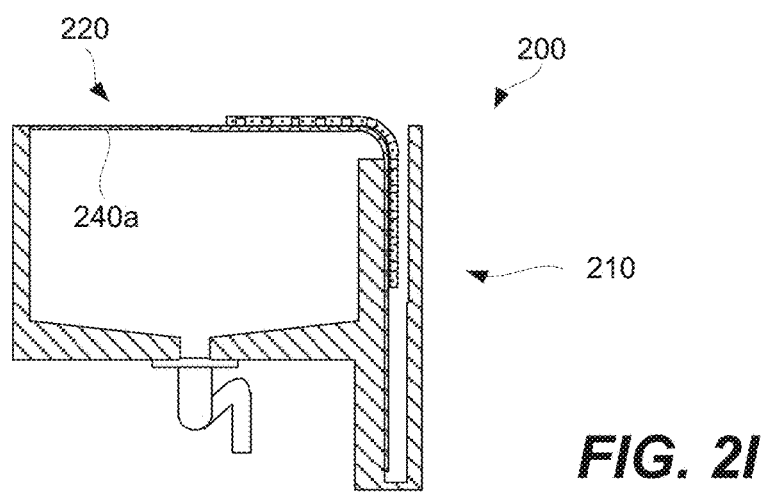
Figure 2J:
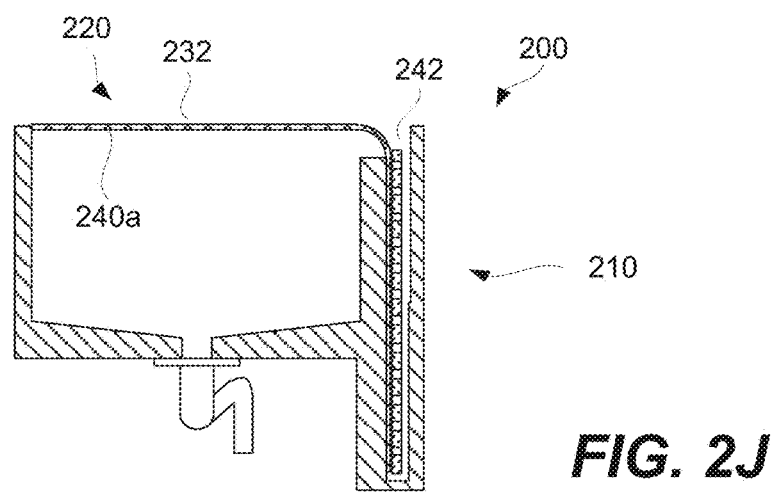

FIGS. 2H-2J are schematic cross-sectional side views of a sink station having a rollable sink cover illustrating different positions of this rollable sink cover, in accordance with some embodiments.

Figure 2K:
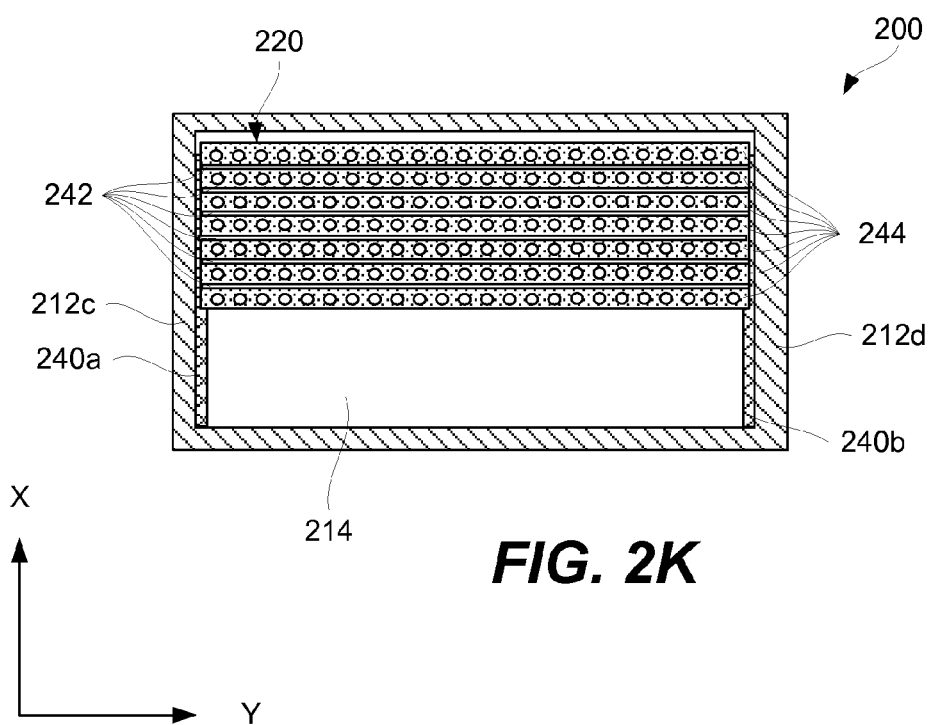

FIG. 2K is a schematic top view of the rollable sink having side rails for supporting the sink station in different positions, in accordance with some embodiments.

FIGS. 3A-3F are schematic top views of a sink station having a sink cover with four portions illustrating different positions of this sink cover, in accordance with some embodiments.

Figure 4:
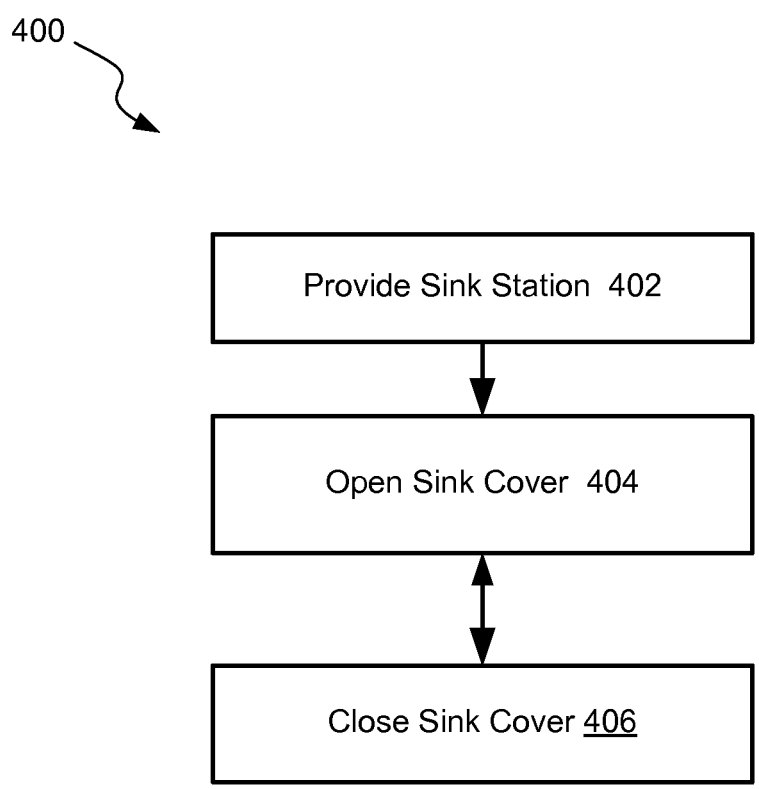

FIG. 4 is a process flowchart of a method for reconfiguring an aircraft sink station, in accordance with some embodiments.

Figure 5:
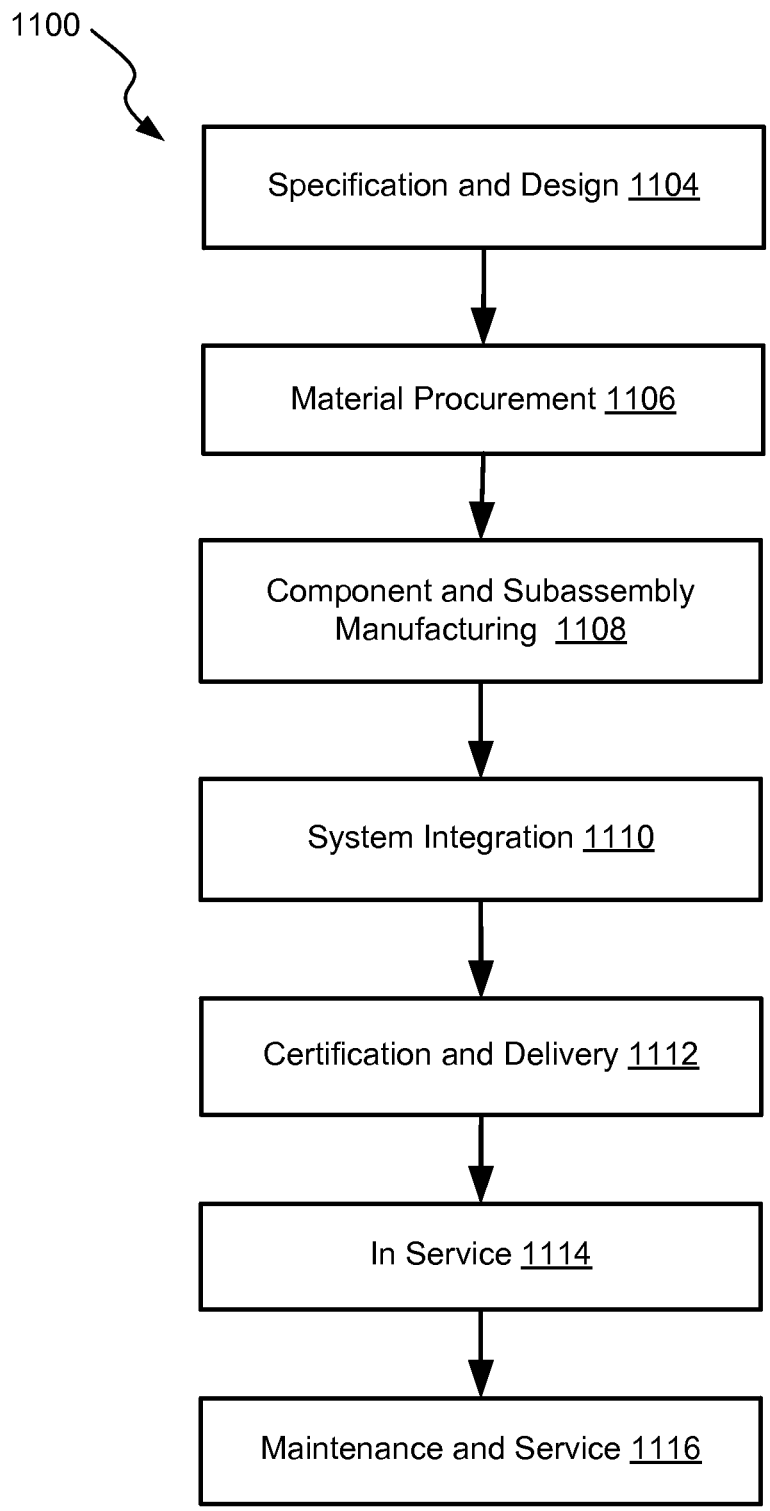

FIG. 5 is a block diagram of an aircraft production and service methodology that may utilize one or more assemblies.

Figure 6:
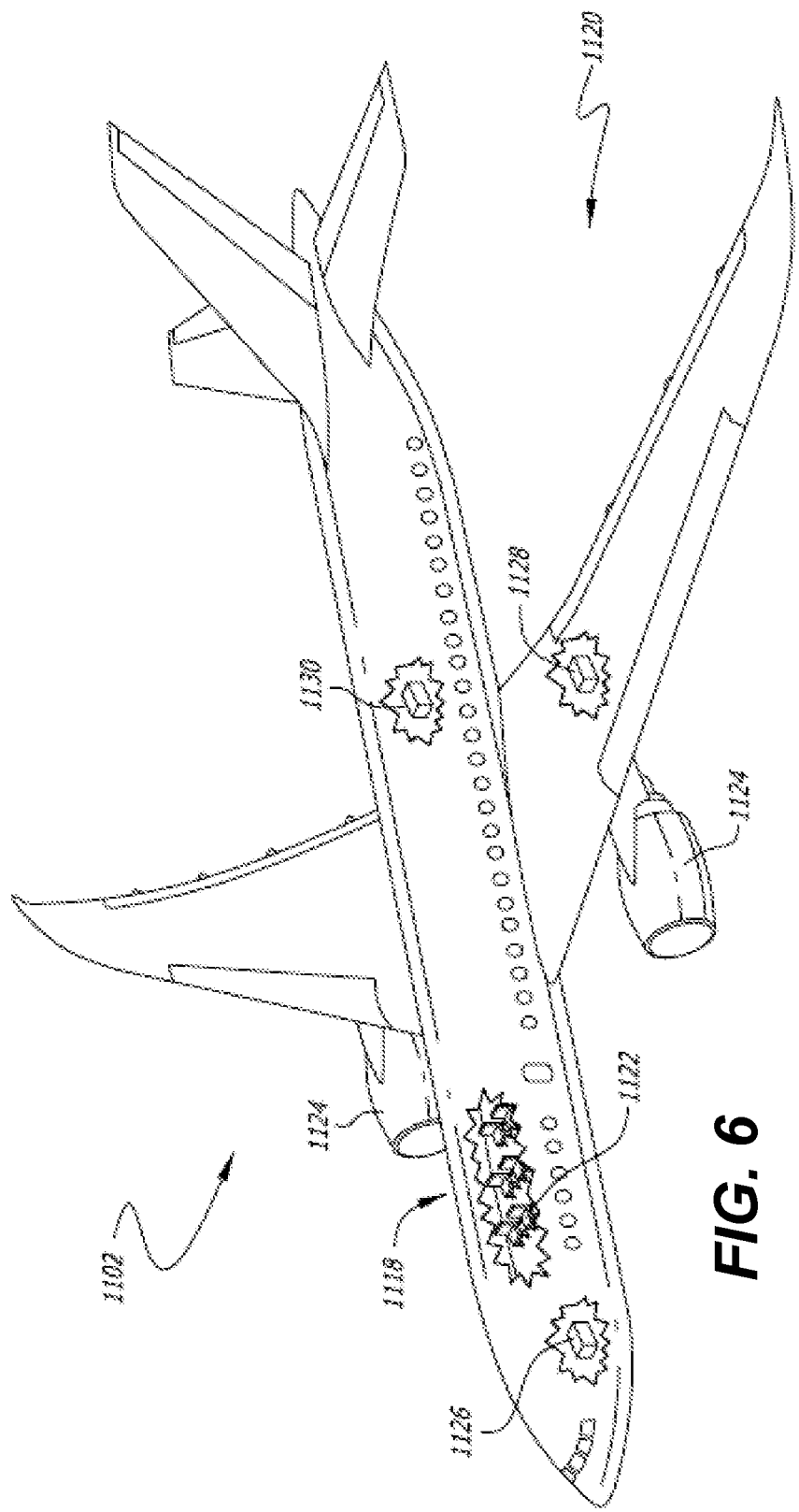

FIG. 6 is a schematic illustration of an aircraft that may utilize one or more assemblies.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

INTRODUCTION

Work space in service galleys, such as countertops, may be very limited on various types of vehicles due to the overall space constraints (e.g., providing more passenger space) and weight restrictions (e.g., keeping the vehicles, in particular, aircraft, as light as possible). Furthermore, many service galleys do not have sinks for generally the same reasons. As such, if an attendant needs to wash an item (e.g., a cup), a lavatory sink is typically used, which increases the lavatory overall use, restricts its availability to passengers, and causes various health concerns. Finally, liquids are often spilled on the countertop due to various movements and vibrations associated with operation of the vehicles.

The described systems use movable sink covers to expand the work space in galleys over sinks. When a cover is installed over a sink, the sink cover may be used as a part of the overall countertop while allowing spilled liquids to pass into the sink below the sink cover. The sink cover may support the weight of various items typically used in a galley while allowing the liquid to flow through the cover at the same time. The sink cover may be used to stage cups when an attendant gets ready to serve drinks to passengers. Any spillage or unwanted liquids simply flows through the opening in the sink cover. It should be noted that spillages are frequent in aircraft and other similar environments because of vehicle motions. This liquid passing feature of the sink cover significantly reduces the amount of time needed to clean the galley and allowing flight attendants to spend more time on other tasks during flight and enhancing operational efficiency.

When the sink or, more specifically, when the sink cavity below the sink cover needs to be accessible (e.g., to wash items), the sink cover may be moved away completely or partially. The sink cover may be folded, rolled, or otherwise moved into its open or partially open position. The partially open position may be also referred to as a partially closed position. It should be noted that the sink may be used with the cover in a fully closed position since water or any other liquids are allowed to pass through the cover.

A brief description of a galley is provided herein to better reflect various features of sink stations. FIG. 1 is a schematic representation of galley 100 having sink station 200, in accordance with some embodiments. Galley 100 includes other components, such as storage cabinets 124a-124b, heating ovens 120a-120c, carts 126a-126d, garbage compactor 130, coffee maker 121, and water boiler 123. Overall, many different components are typically positioned within the small space allocated to galley 100. This concentration of components puts constraints on availability and size of some components. For example, sink station 200 cuts away from the space available to countertop 125. Furthermore, heating ovens 120a-120c disposed above countertop 125 may interfere with the use of countertop 125. Sink station 200 may positioned close to liquid handling components, such as coffee maker 121 and water boiler 123, such that any spills during operating of these components are directed into sink station 200 or, more specifically, into the sink cavity of sink station 200. Sink station 200 may be positioned on the same level as countertop 125. In some embodiments, countertop 125 is disposed above carts 126a-126d.

Sink Cover Examples

FIG. 2A is a schematic cross-sectional side view of aircraft galley sink station 200 with sink cover 220 shown in its covered position, in accordance with some embodiments. Specifically, aircraft galley sink station 200 or, simply, sink station 200 may include sink 210, faucet 202, and sink cover 220. Sink 210 may be a standard sink used in aircraft galleys or a specially designed sink, such as a sink with a specific support(s) for sink cover 220, compartment(s) for sink cover 220, and/or other sink features further described below. Sink 210 includes back wall 212a, front wall 212b, left side wall 212c, and right side wall 212d. While the schematic cross-sectional side of FIG. 2A only shows back wall 212a and front wall 212b, all four walls can be seen in any of the top views shown in FIG. 2K or FIGS. 3A-3F. It should be noted that sink 210 may not have a rectangular shape depicted in these figures. For example, sink 210 may be a round sink, an elliptical sink, or any other shape sink. In these non-rectangular examples, back wall 212a, front wall 212b, left side wall 212c, and right side wall 212d may represent portions of the perimeter walls. In some embodiments, sink 210 is rectangular (based on the top view) or substantially rectangular e.g., a straight portion of each wall represents at least about 75% of the sink dimension in this direction. Back wall 212a, front wall 212b, left side wall 212c, right side wall 212d, and bottom 215 form sink cavity 214 associated with sink opening 217 shown in FIG. 2B. Sink cavity 214 is used to collect liquids (e.g., water). For example, water may be supplied from faucet 202 and be directed from sink cavity 214 into the drain disposed at bottom 215. A liquid may be also purposely or accidentally disposed into sink cavity 214 by an attendant. In some embodiments, a liquid may be delivered into sink cavity 214 while sink cover 220 is in its covered position as, for example, shown in FIG. 2A.

In some embodiments, at least two walls of back wall 212a, front wall 212b, left side wall 212c, and right side wall 212d has top edges that form a plane substantially co-planar with the top surface of the countertop surrounding sink 210 (e.g., countertop 125 shown in FIG. 1). In some embodiments, this pair of walls includes left side wall 212c and right side wall 212d. In specific embodiments, all four walls (i.e., back wall 212a, front wall 212b, left side wall 212c, and right side wall 212d) have top edges that form the plane substantially co-planar with the top surface of the countertop surrounding sink 210. In these embodiments, the top surface of sink cover 220 may be also coplanar with the top surface of the countertop surrounding sink 210 as further described below. For examples, FIG. 2A illustrates top edge 213a of back wall 212a and top edge 213b of front wall 212b forming a plane that is co-planar to top surface 223 of sink cover 220. In this case, sink cover 220 is operable as an extension of the countertop that allows sliding objects between the countertop and sinks cover 220.

Faucet 202 is used for delivering water into sink cavity 214. Faucet 202 may include one or more valves or some other devices for controlling the flow of water into sink 210. Faucet 202 may be used to delivery two or more flows, e.g., hot water and cold water.

Sink cover 220 may be movable between its covered position, e.g., shown in FIG. 2A and its open position, e.g., shown in FIG. 2B. In the covered position, sink cavity 214 may be completely enclosed by sink cover 220 such that a typical size objects cannot fall into sink cavity 214 through sink cover 210 or between sink cover 210 and sink walls. At the same time, sink cover 210 allows for liquid delivered above sink cover 220 (e.g., from operation of faucet 202) to flow into sink cavity 214. For example, sink cover 220 may have multiple openings 222 as further described below. In the open position, sink cavity 214 may substantially open. For example, in this state, at least 90% of sink opening 217 defined by the top edges of back wall 212a, front wall 212b, left side wall 212c, and right side wall 212d may be unobstructed by sink cover 220 or, more specifically, at least 95% may be unobstructed. In some embodiments, a small portion of sink opening 217 may be obstructed by sink cover 220 when, for example, sink cover 220 is stored within sink cavity 214 as, for example, shown in FIG. 2B. In this open position of sink cover 220, sink cover 220 may drip the remaining water into sink cavity 214. It should be noted that sink cover 220 may also be used in various partially covered positions as further described below with reference to FIGS. 2C, 2D and 2I as well as FIGS. 3A-3F.

Overall, when sink cover 220 is in the covered position, sink cover 220 may substantially cover sink cavity 214 and may be disposed between faucet 202 and bottom 215. In this covered position, sink cover 220 may extend substantially parallel to the plane defined by the top edges of at least two of back wall 212a, front wall 212b, left side wall 212c, and right side wall 212d as, for example, shown in FIG. 2A. More specifically, when sink cover 220 is in the covered position, sink cover 220 extends within the plane defined by the top edges of at least two of back wall 212a, front wall 212b, left side wall 212c, and right side wall 212d.

In some embodiments, sink cover 220 may become extension of the countertop surrounding sink station 200 and may extend within same plane with the top surface of the countertop. Specifically, the top edges of at least left side wall 212c or right side wall 212d may be also parts of the countertop. Alternatively, sink cover 220 may be recessed into sink cavity 214 as, for example, shown in FIG. 2G. In other words, sink cover 220 may be positioned at a level between bottom 215 and the plane defined by the top edges of at least two of back wall 212a, front wall 212b, left side wall 212c, and right side wall 212d as, for example, shown in FIG. 2G illustrating top edges 213a and 213b of back wall 212a and front wall 212b, respectively. The recessed position of sink cover 220 may help to prevent splashing during operation of sink station 200 when sink cover 220 is in the closed or partially closed position. Regardless of the location of sink cover 220 in the covered position (e.g., within the plane of the countertop or recessed), sink cover 220 may be configured to support a set weight exerted on to sink cover 220 in the direction substantially perpendicular to the plane defined by the top edges.

Sink cover 220 may include multiple openings 222 allowing water or any other liquid to pass through sink cover 220 and into sink 210 or, more specifically, into sink cavity 214 when sink cover 220 is in the covered position. The size of openings 222 maybe such that they prevent set size objects to fall through openings 222 and into sink cavity 214 while allow liquids to pass through. In some embodiments, sink cover 220 is a mesh.

Sink cover 220 may be movably connected to at least one of walls, i.e., back wall 212a, front wall 212b, left side wall 212c, and right side wall 212d. Sink cover 220 may be movably connected to this one wall when it is in both in the covered and open positions. Specifically, the movable connection may allow sink cover 220 to move between the covered and open positions and, in some embodiments, operate in one or more intermediate positions, which may be collectively referred to as partially covered positions. The movable collection may allow sink cover 220 to tilt, swing, roll, slide, and/or perform other movements with respect to the wall, to which it is connected. Overall, sink cover 220 is movable with respect to sink 210 between covered position and open position.

In some embodiments, sink cover 220 is separably connected to at least one of back wall 212a, front wall 212b, left side wall 212c, and right side wall 212d. This separable connection feature may be combined with the movable connection to at least one other wall, which is described above. In other words, sink cover 220 may be movably connected to one wall and separably connected to one or more other walls. Alternatively, this separable connection feature may be used instead of the movable connection and may allow sink cover 220 to be completely removed from sink 210. It should be noted that sink cover 220 may be separably connected two or more of four walls and, in some embodiments, to all four walls. Specifically, sink cover 220 may be separated from all walls to which it is connected. Alternatively, sink cover 220 may be separated from one or more walls and remain connected to at least one wall to which it may have a movable connection. For example, sink cover 220 may be separably connected to left side wall 212c and right side wall 212d when sink cover 220 is in closed position. When sink cover 220 moves into its open position, it may be separated from left side wall 212c and right side wall 212d, but sink cover 220 may remain connected to back wall 212a or front wall 212b as, for example, shown in FIGS. 2B and 2E.

In some embodiments, sink cover 220 is connected or supported by all four walls, when sink cover 220 is in the covered position. Alternatively, sink cover 220 may be supported by three walls only, e.g., left side wall 212c and right side wall 212d as well as one of back wall 212a or front wall 212b. In some embodiments, sink cover 220 may be supported by two walls only, e.g., left side wall 212c and right side wall 212d. Furthermore, sink cover 220 may be supported by only one wall, e.g., back wall 212a or front wall 212b. In this case, sink cover 220 may have a reinforcement structure that allows sink cover 220 to be in the covered position while being connected to one wall only.

In order for sink cover 220 to move between its covered and open positions, sink cover 220 may include a hinge used for connecting sink cover 220 to at least one of the walls. For example, FIG. 2A illustrates sink cover 220 having back hinge 225 that connects sink cover 220 to back wall 212a. Specifically, back hinge 225 allows sink cover 220 to fold into sink cavity 214 when sink cover 220 is moved into the open position. In some embodiments, sink cover 220 also includes one or more middle hinges. For example, FIG. 2A sink cover 220 having middle hinge 227 that allows sink cover 220 to fold in half when sink cover 220 is moved into the open position. In this example, sink cavity 214 may not be sufficiently deep (in the Z direction) to accommodate the entire width of sink cover 220 (extending in the X direction in FIG. 2A). Furthermore, this feature also allows partially covering sink cavity 214 with the folded sink cover while keeping a portion of sink cavity 214 exposed, which will now be described with reference to FIGS. 2C-2D and FIGS. 3A-3D.

FIG. 2A illustrates sink cover 220 having front portion 226 and back portion 228. Front portion 226 may be movable relative to sink 210 independently from back portion 228 using, for example, middle hinge 227. This independent movement of front portion 226 and back portion 228 allows a partially closed position of sink cover 220. Specifically, FIG. 2A illustrates sink cover 220 in the closed position when front portion 226 and back portion 228 extend within the same plane. FIG. 2B illustrates sink cover 220 in the fully open position when front portion 226 and back portion 228 are folded with respect to each other and both portions are folded with respect to sink 210. FIG. 2C illustrates sink cover 220 in a partially open position when front portion 226 and back portion 228 are folded with respect to each other, but back portion 228 is retained in its closed position. As such, sink cavity 214 is accessible through an opening that would have been otherwise covered with front portion 226. In this position (shown in FIG. 2C), front portion 226 and back portion 228 may be supported by side rails further described below with reference to FIG. 2K. FIG. 2D illustrates sink cover 220 in another partially open position when front portion 226 and back portion 228 are folded with respect to each other, but front portion 226 is retained in its closed position. As such, sink cavity 214 is accessible through an opening that would have been otherwise covered with back portion 228. In this position (shown in FIG. 2D), front portion 226 and back portion 228 may be also supported by side rails.

Figure 3A:
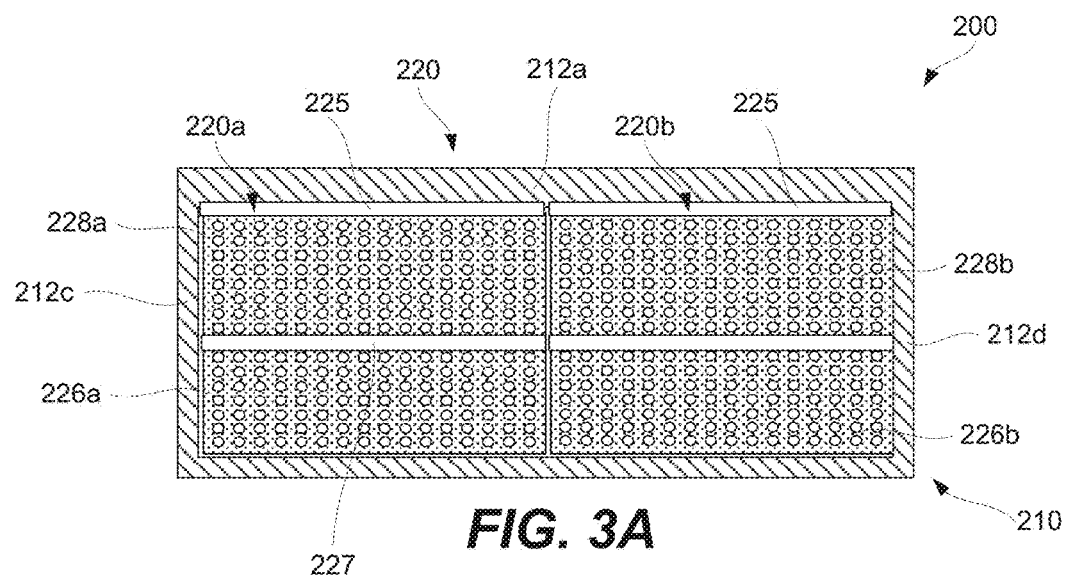
Figure 3B:
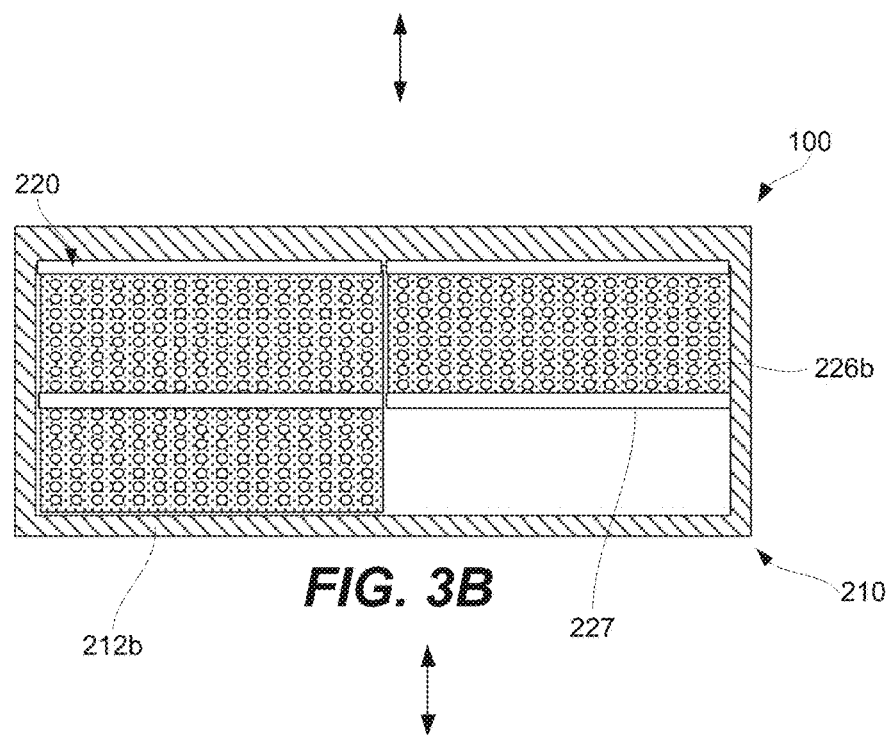

FIGS. 3A-3F is a schematic top view of sink station 200 having sink cover 200 with four portions 226a, 226b, 228a, and 228b illustrating different positions of sink cover 200, in accordance with some embodiments. More generally, sink cover 220 includes a first portion 220a and a second portion 220b. First portion 220a and second portion 220b may be independently attached, e.g., pivotably attached to back wall 212a of sink 210 as shown in FIG. 3A. This feature allows to independently operate first portion 220a and second portion 220b and open a part of sink 210 as, for example, shown in FIG. 3B, which illustrates first portion 220a in the closed position and second portion 220b in the open position. One having ordinary skills in the art would understand that an inverse example is also possible with this sink cover, e.g., first portion 220a in the open position and second portion 220b in the closed position.

Figure 3C:
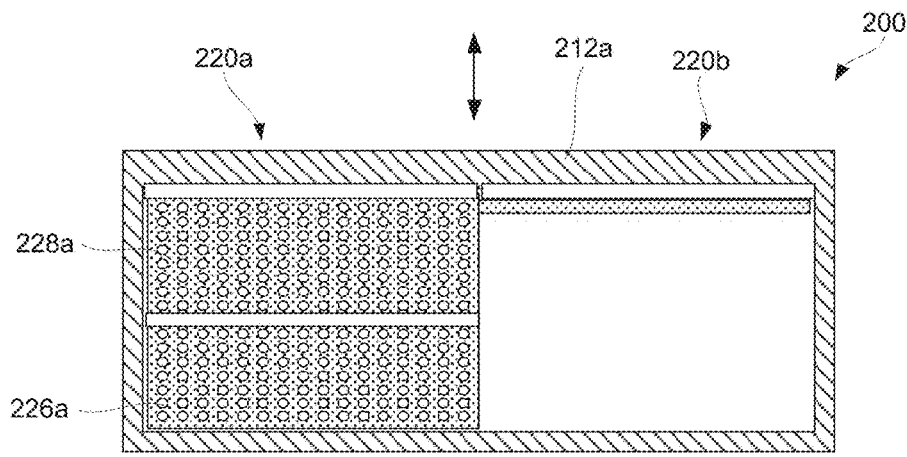
Figure 3D:
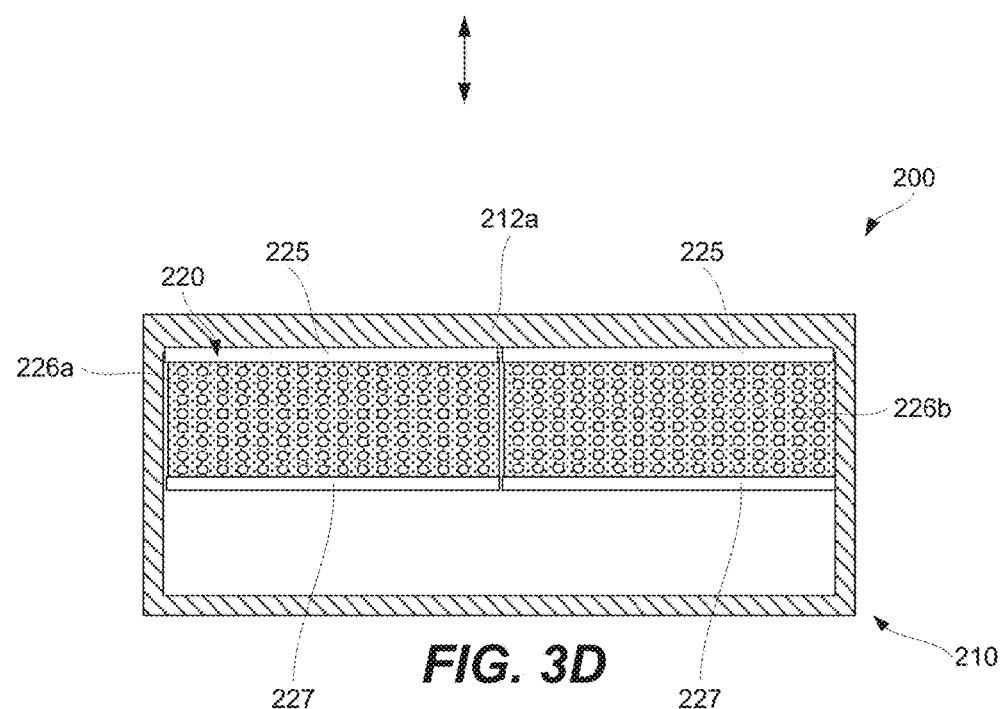
Figure 3E:
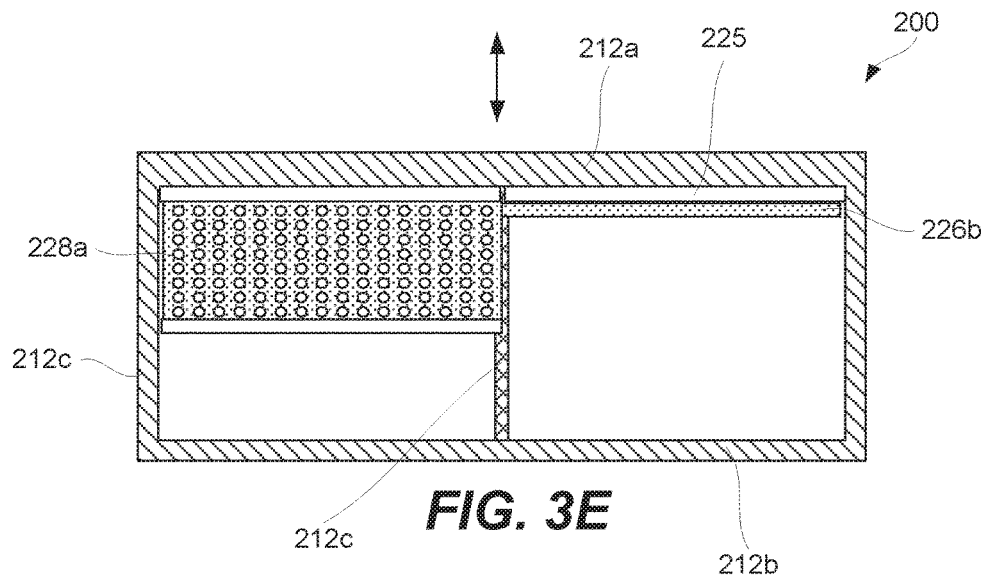
Figure 3F:
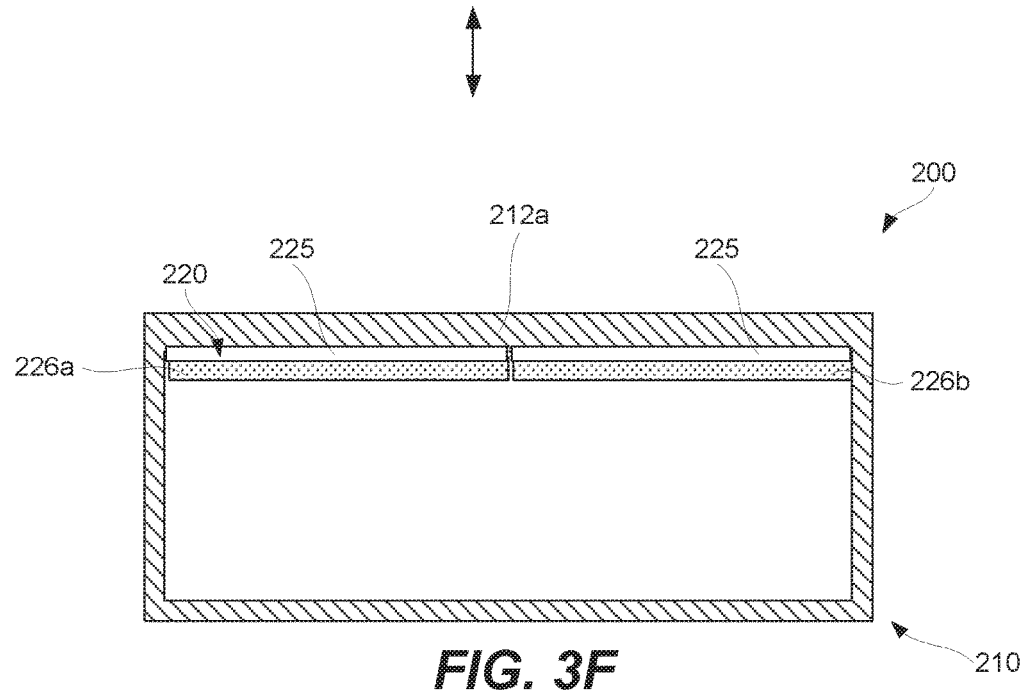

As shown in FIG. 3A, first portion 220a may include first front portion 226a and first back portion 228a pivotably attached to first front portion 226a. Second portion 220b may include second front portion 226b and second back portion 228b pivotably attached to second front portion 226b. As such, first front portion 226a may be opened without opening first back portion 228a. Likewise, second front portion 226b may be opened without opening second back portion 228b as, for example, shown in FIG. 3B. It should be noted that first front portion 226a and first back portion 228a may be pivoted independently from second front portion 226b and second back portion 228b. For example, second front portion 226b and second back portion 228b may be opened while first front portion 226a and first back portion 228a may remain the closed position as shown in FIG. 3C. In another example shown in FIG. 3D, first front portion 226a and second front portion 226b may be opened while first back portion 228a and second back portion 228b may remain the closed position. FIG. 3E illustrates an example where only first back portion 228a is in the closed positioned, while all other portions are opened. One having ordinary skills in the art would understand that an inverse example is also possible such as only second back portion 228b being in the closed positioned, while all other portions being open. Finally, FIG. 3F illustrates all portions being open.

Referring to FIG. 3E, first back portion 228a may be supported by left side wall 212c and back wall 212a. In some embodiments, sink station 200 may include center support rail 212c extending between back wall 212a and front wall 212b. Center support rail 212c may be used to support each of first front portion 226a, first back portion 228a, second front portion 226b, and second back portion 228b when any of these portions is in the closed position. Specifically, FIG. 3E illustrates an example in which only first back portion 228a is supported by center support rail 212c. Center support rail 212c may be removable to provide more access to sink cavity 214.

In some embodiments, left side wall 212c and right side wall 212d are equipped with rails to provide support to sink cover 220 when it is in the covered position and any of partially covered positions. FIG. 2K illustrates first rail 240a attached to left side wall 212c and second rail 240b attached to right side wall 212d. First rail 240a and second rail 240b provide continuous support to sink cover 220 along the X direction, which allows using sink cover 220 that is flexible around or about the Y axis, for example. Specifically, sink cover 220 includes hinges 242 separating portions 244. Hinges 242 allow portions 244 to pivot with respect to each other around or about the Y axis. This type of sink cover 220 may be used in various rollable configurations shown in FIG. 2G and FIGS. 2H-2J.

FIG. 2G illustrates sink cover 220 having rollable base 232 and take-up roll 234 for receiving rollable base 232 when sink cover 220 goes into in the opened position. Rollable base 232 may be formed by rigid bars connected by hinges, e.g., similar to the one shown in FIG. 2K. The rigid bars and hinges may extend across the entire width of sink cavity 214 (i.e., the Y direction on FIG. 2K). Rollable base 232 may provide support to objects positioned onto rollable base 232 when sink cover 220 is in the open position.

In some embodiments, sink cover 220 may be moved into a compartment provided in one of walls when sink cover 220 is in the open position. Such examples are shown in FIG. 2F and FIGS. 2H-2J. Specifically, FIG. 2F illustrates sink 210 having compartment 224 positioned in back wall 212a. In general, such a compartment may be positioned in any one of the four walls. In some embodiments, a portion of sink cover 220 may be positioned in one compartment while another portion may be positioned in another compartment. As show in FIG. 2F, sink cover 220 may be folded when it is moved into compartment 224. Compartment 224 may include compartment cover 216 to prevent water or other liquid from splashing into compartment. Furthermore, sink 210 may include drain 229 connected to compartment 224 to evacuate water from compartment 224 (e.g., water dropping from sink cover 220) and ensure drying of sink cover 220 when sink cover 220 is stored in compartment 224.

Alternatively, sink cover 220 may be suspended inside sink 210 or outside of sink 210 when sink cover 220 is in the open position. FIG. 2B illustrates sink cover 220 suspended with sink cavity 214. FIG. 2E illustrates sink cover 220 suspended outside of sink cavity 214. Specifically, sink cover 220 may be connected to front wall 212b using front hinge 221, which support sink cover 220 as it hangs on front wall 212b outside of sink cavity 214.

Processing Examples

FIG. 4 is a process flowchart of method 400 for reconfiguring an aircraft sink station, in accordance with some embodiments. Method 400 involves providing the aircraft sink station during operation 402. Various examples of aircraft sink stations are described above. Specifically, the aircraft sink station provided during operation 402 may include a sink and sink cover. The sink cover may be movably connected to at least one of wall of the sink and may be movable with respect to the sink (or, more specifically, with respect to the wall to which the cover is movably connected) between a covered position and open position. When the sink cover is in the covered position, the sink cover substantially covers the sink cavity and may extend substantially parallel to the plane defined by top edges of the sink walls. The sink cover may be configured to support a set weight exerted on to the sink cover during operation of the station. The sink cover may be supported by at least two sink walls, e.g., two side walls. The side walls may include rails for supporting the sink cover. The sink cover may include a plurality of openings allowing a liquid to pass through the sink cover and into the sink even when the sink cover is in the covered position.

Method 400 may also involve at least partially opening the sink cover during operation 404. For example, the sink cover may be moved from its covered position to its open position or at least to its partially covered position. In some embodiments, operation 404 may involve moving (e.g., swinging) the entire sink cover or one or more portions thereof. For example, the sink cover may be folder as shown in FIGS. 2B-E or FIGS. 3A-F or rolled as shown in FIGS. 2G-2J. Operation 404 may be performed in order to gain more access to the sink cavity, which may be otherwise blocked by the sink cover.

Method 400 may involve at least partially closing the sink cover during operation 406. For example, the sink cover may be moved from its open position to its covered position or at least to a partially covered position. In other examples, the sink cover may be moved from its partially covered position to another partially covered position or to the fully covered position. In some embodiments, operation 406 may involve moving (e.g., swinging) the entire sink cover or one or more portions thereof. For example, the sink cover may be folder as shown in FIGS. 2B-E or FIGS. 3A-F or rolled as shown in FIGS. 2G-2J. Operation 406 may be performed in order to increase the countertop surface, such as using the sink cover as a part of the countertop. It should be noted that unlike the rest of the countertop around the sink station, the sink cover allows the liquid to pass through. As such, any spills onto the sink cover do not need to be handled in the same manner as spills onto the conventional countertop.

Examples of Aircraft Application

Examples of the disclosure may be described in the context of an aircraft manufacturing and service method 1100 as shown in FIG. 5 and aircraft 1102 as shown in FIG. 6. During pre-production, illustrative method 1100 may include specification and design 1104 of the aircraft 1102 and material procurement 1106. During production, component and subassembly manufacturing 1108 and system integration 1110 of aircraft 1102 take place. For example, an aircraft galley sink station may be installed onto aircraft during operation 1108 or operation 1110. Thereafter, aircraft 1102 may go through certification and delivery 1112 to be placed in service 1114. In some embodiments, an aircraft galley sink station may be installed onto aircraft during operation 1112 or operation 1114. While in service by a customer, aircraft 1102 is scheduled for routine maintenance and service 1116 (which may also include modification, reconfiguration, refurbishment, and so on).

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by illustrative method 1100 may include airframe 1118 with a plurality of high-level systems 1120 and interior 1122. An aircraft galley sink station may be a part of interior 1122. More specifically, the aircraft galley sink station positioned with the fuselage. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

CONCLUSION

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

What is claimed is:

1. An aircraft galley sink station for use in a galley of an aircraft, the aircraft galley sink station comprising:
    a sink comprising:
        a back wall,
        a front wall,
        a left side wall,
        a right side wall, and
        a bottom forming a sink cavity;
    a faucet for delivering water into the sink cavity;
    a sink cover movably connected to at least one of the back wall, the front wall, the left side wall, and the right side wall,
        wherein the sink cover is movable with respect to the sink between a covered position and an open position,
        wherein the sink cover is pivotably connected to at least the back wall,
        wherein, when the sink cover is in the covered position, the sink cover substantially covers the sink cavity, extends substantially parallel to a plane defined by top edges of the back wall, the front wall, the left side wall, and the right side wall, and is configured to support a set weight exerted on to the sink cover in a direction substantially perpendicular to the plane defined by the top edges of the back wall, the front wall, the left side wall, and the right side wall,
        wherein the sink cover is supported by at least two of the back wall, the front wall, the left side wall, and the right side wall when the sink cover is in the covered position,
        wherein the sink cavity is substantially open when the sink cover is in the open position, and
        wherein the sink cover comprises a plurality of openings allowing a liquid to pass through the sink cover and into the sink when the sink cover in the covered position.

2. The aircraft galley sink station of claim 1, wherein the sink cover is supported by all four of the back wall, the front wall, the left side wall, and the right side wall while the sink cover is in the covered position.

3. The aircraft galley sink station of claim 1, wherein, when the sink cover is in the covered position, the sink cover extends within the plane defined by top edges of the back wall, the front wall, the left side wall, and the right side wall.

4. The aircraft galley sink station of claim 3, wherein the top edges of at least the left side wall or the right side wall are parts of a countertop of an aircraft galley.

5. The aircraft galley sink station of claim 1, wherein the sink cover is separably connected to the at least one of the back wall, the front wall, the left side wall, and the right side wall allowing the sink cover to be removed from the sink.

6. The aircraft galley sink station of claim 1, wherein the sink cover is foldable.

7. The aircraft galley sink station of claim 1,
    wherein the sink cover comprises:
        a front portion, and
        a back portion, and
    wherein the front portion is movable relative to the sink independently from the back portion allowing a partially closed position of the sink cover.

8. The aircraft galley sink station of claim 7, wherein the front portion and the back portion are connected by a middle hinge.

9. The aircraft galley sink station of claim 7, wherein the back portion is supported by at least one of the left side wall or the right side wall when the sink cover is in the partially closed position.

10. The aircraft galley sink station of claim 1,
    wherein the sink cover comprises:
        a first portion, and
        a second portion, and
    wherein the first portion and the second portion are independently attached to the back wall of the sink and independently movable with respect to the back wall.

11. The aircraft galley sink station of claim 10,
    wherein the first portion comprises:
        a first front portion, and
        a first back portion pivotably attached to the first front portion, and
    wherein the second portion comprises a second front portion and a second back portion pivotably attached to the second front portion.

12. The aircraft galley sink station of claim 1, further comprising:
    a first rail, and
    a second rail,
        the first rail and the second rail supporting the sink cover in the covered position and in the opened position and supporting the sink cover while moving between the covered position and in the opened position,
    wherein the first rail is disposed along the left side wall, and
    wherein the second rail is disposed along the right side wall.

13. The aircraft galley sink station of claim 12,
    wherein the sink cover comprises multiple hinges extending between the first rail and the second rail, and
    wherein the multiple hinges separate multiple portions of the sink cover foldable with respect to each other thereby allowing the sink cover to advance along the first rail and the second rail between the covered position and in the opened position.

14. An aircraft galley sink station for use in a galley of an aircraft, the aircraft galley sink station comprising:
    a sink comprising:
        a back wall,
        a front wall,
        a left side wall,
        a right side wall, and
        a bottom forming a sink cavity;
    a faucet for delivering water into the sink cavity;
    a sink cover movably connected to at least one of the back wall, the front wall, the left side wall, and the right side wall,
        wherein the sink cover is movable with respect to the sink between a covered position and an open position,
        wherein, when the sink cover is in the covered position, the sink cover substantially covers the sink cavity, extends substantially parallel to a plane defined by top edges of the back wall, the front wall, the left side wall, and the right side wall, and is configured to support a set weight exerted on to the sink cover in a direction substantially perpendicular to the plane defined by the top edges of the back wall, the front wall, the left side wall, and the right side wall, wherein the sink cover is supported by at least two of the back wall, the front wall, the left side wall, and the right side wall when the sink cover is in the covered position, wherein the sink cavity is substantially open when the sink cover is in the open position, wherein the sink cover comprises a plurality of openings allowing a liquid to pass through the sink cover and into the sink when the sink cover in the covered position, wherein the back wall of the sink comprises a compartment, and wherein the sink cover is disposed within the compartment when the sink cover is in the open position.

15. The aircraft galley sink station of claim 14, wherein the sink comprises a compartment cover covering the compartment and protecting the sink cover within the compartment.

16. An aircraft galley sink station for use in a galley of an aircraft, the aircraft galley sink station comprising:
a sink comprising:
a back wall,
a front wall,
a left side wall,
a right side wall, and
a bottom forming a sink cavity;
a faucet for delivering water into the sink cavity;
a sink cover movably connected to at least one of the back wall, the front wall, the left side wall, and the right side wall,
wherein the sink cover is movable with respect to the sink between a covered position and an open position,
wherein, when the sink cover is in the covered position, the sink cover substantially covers the sink cavity, extends substantially parallel to a plane defined by top edges of the back wall, the front wall, the left side wall, and the right side wall, and is configured to support a set weight exerted on to the sink cover in a direction substantially perpendicular to the plane defined by the top edges of the back wall, the front wall, the left side wall, and the right side wall,
wherein the sink cover is supported by at least two of the back wall, the front wall, the left side wall, and the right side wall when the sink cover is in the covered position,
wherein the sink cavity is substantially open when the sink cover is in the open position,
wherein the sink cover comprises a plurality of openings allowing a liquid to pass through the sink cover and into the sink when the sink cover in the covered position, and
wherein the sink cover comprises:
a rollable base, and
a take-up roll for receiving the rollable base.

17. An aircraft comprising:
a fuselage;
an aircraft galley sink station positioned within the fuselage,
wherein the aircraft galley sink station comprises:
a sink comprising:
a back wall,
a front wall,
a left side wall,
a right side wall, and
a bottom forming a sink cavity;
a faucet for delivering water into the sink cavity;
a sink cover movably connected to at least one of the back wall, the front wall, the left side wall, and the right side wall,
wherein the sink cover is movable with respect to the sink between a covered position and an open position,
wherein the sink cover is pivotably connected to at least the back wall,
wherein, when the sink cover is in the covered position, the sink cover substantially covers the sink cavity, extends substantially parallel to a plane defined by top edges of the back wall, the front wall, the left side wall, and the right side wall, and is configured to support a set weight exerted on to the sink cover in a direction substantially perpendicular to the plane defined by the top edges of the back wall, the front wall, the left side wall, and the right side wall,
wherein the sink cover is supported by at least two of the back wall, the front wall, the left side wall, and the right side wall when the sink cover is in the covered position,
wherein the sink cavity is substantially open when the sink cover is in the open position, and
wherein the sink cover comprises a plurality of openings allowing a liquid to pass through the sink cover and into the sink when the sink cover in the covered position.

18. A method for reconfiguring an aircraft sink station, the method comprising
providing the aircraft sink station comprising:
a sink comprising:
a back wall,
a front wall,
a left side wall,
a right side wall, and
a bottom forming a sink cavity;
a faucet for delivering water into the sink cavity;
a sink cover movably connected to at least one of the back wall, the front wall, the left side wall, and the right side wall,
wherein the sink cover is movable with respect to the sink between a covered position and an open position,
wherein the sink cover is pivotably connected to at least the back wall,
wherein, when the sink cover is in the covered position, the sink cover substantially covers the sink cavity, extends substantially parallel to a plane defined by top edges of the back wall, the front wall, the left side wall, and the right side wall, and is configured to support a set weight exerted on to the sink cover in a direction substantially perpendicular to the plane defined by the top edges of the back wall, the front wall, the left side wall, and the right side wall,
wherein the sink cover is supported by at least two of the back wall, the front wall, the left side wall, and the right side wall when the sink cover is in the covered position,
wherein the sink cavity is substantially open when the sink cover is in the open position, and wherein the sink cover comprises a plurality of openings allowing a liquid to pass through the sink cover and into the sink when the sink cover in the covered position;
at least partially opening the sink cover from the sink; and
at least partially closing the sink with the sink cover.

* * * * *